May 8, 1956  J. J. BLACK  2,744,781
EXPANSIBLE VEHICLE BODY
Filed March 9, 1953  9 Sheets-Sheet 1

INVENTOR.
BY James J. Black.
Wood, Herron & Evans.
ATTORNEYS.

May 8, 1956 J. J. BLACK 2,744,781
EXPANSIBLE VEHICLE BODY
Filed March 9, 1953 9 Sheets-Sheet 5

INVENTOR.
James J. Black.
BY Wood, Herron & Evans.
ATTORNEYS.

May 8, 1956 J. J. BLACK 2,744,781
EXPANSIBLE VEHICLE BODY
Filed March 9, 1953 9 Sheets-Sheet 7

Fig. 9

INVENTOR.
BY James J. Black.
Wood, Herron & Evans.
ATTORNEYS.

May 8, 1956  J. J. BLACK  2,744,781
EXPANSIBLE VEHICLE BODY
Filed March 9, 1953  9 Sheets-Sheet 8

INVENTOR.
James J. Black.
BY Wood, Herron & Evans
ATTORNEYS.

United States Patent Office 2,744,781
Patented May 8, 1956

2,744,781

EXPANSIBLE VEHICLE BODY

James J. Black, Cincinnati, Ohio, assignor to Trailmobile, Inc., Chicago, Ill., a corporation of Delaware Application March 9, 1953, Serial No. 341,281

11 Claims. (Cl. 296—21)

This invention relates to an improved body construction for trucks, transport trailers and similar vehicles, in which the body is provided with laterally shiftable side sections or housings adapting it as an assembly, to be expanded or contracted in width. The primary purpose of structures of this class is to provide a vehicle body which, in contracted condition, has a width dimension approximately the same as a conventional truck or trailer, or at least within prescribed legal limits, and suitable for ordinary road service. However the body is capable of being expanded laterally in a horizontal plane to provide a substantially greater width and internal floor space when parked at a desired location.

Bodies of this general nature have been proposed in the past and the present invention is directed to structural improvements which, as explained later, impart greater convenience and practical utility to the vehicle. In expanded condition, the body structure of the present invention may be approximately twice its normal or contracted width, the expansible sections or housings being projected outwardly from opposite sides without any external support, and without disturbing the balance condition of the trailer with respect to its road wheels or landing gear. The present expansible body provides a mobile unit in which various types of equipment, fixtures or the like, may be installed permanently upon the floor, while the expansible sections, when extended outwardly, provide a generous floor area along opposite sides of the equipment or fixtures.

The expansible body thus provides the mobility of the conventional trailer or truck without the undesirable space restrictions usually associated with vehicles and has a wide variety of uses, particularly in commercial and military activities in which equipment must be transported from place to place and utilized as a permanent part of the vehicle in the field. To cite a few specific examples, the present structure is intended to be utilized as training quarters for military personnel, or as a traveling medical or dental laboratory, or as a station housing electronic equipment. In the commercial field, the trailer may be employed as a traveling showroom, field office, retail store or the like. The shiftable body sections, in their expanded state, provide the necessary floor space around the equipment and form a completely closed body assembly with adequate head room. The present improvements are disclosed in relation to a semi-trailer, although it will be apparent that the structure can be incorporated, without substantial change, in truck bodies and in the bodies of trailers of the four-wheel type.

Briefly described, the structure comprises a fixed trailer body, generally of conventional shape, which includes a trailer frame having a fixed floor and roof structure. The respective laterally expansible sections are slidably mounted along opposite sides of the body and are normally telescoped within the body in nested relationship to the fixtures or equipment which is installed upon the trailer floor. Upon being transported to its destination in the field, the shiftable sections are expanded outwardly from the opposite sides of the trailer body by operation of a body expanding mechanism as described later.

Each housing section comprises a box-like structure which incorporates its own roof, side wall and opposite end walls, and each section, upon being extended outwardly, is supplied with a floor section which is flush with and forms a continuation of the floor of the trailer body. Thus, the inner side and bottom of the housing sections are open, and each housing, in contracted position, forms a shell which is adapted to nest over the fixtures or equipment from opposite sides. Upon being shifted to expanded position, the inner edges of the end walls and roof of the housing section join and complement the side wall of the trailer body and form, in effect, an integral part of the trailer body.

One of the primary objects of the invention has been to provide a body expanding mechanism which is easily operated by hand; which is adapted to shift both expansible housing sections in unison; and which is adapted to support the expanded sections rigidly in cantilever fashion without requiring any external supporting means.

In its simplest aspect, the expanding mechanism comprises a system of horizontally disposed screw shafts which are in threaded engagement with each shiftable housing, preferably at the four corners, together with a driving system adapted to rotate all of the screw shafts at a uniform rate in expanding or contracting direction. The weight load of each housing section is imposed directly upon a pair of rollers disposed beneath the housing, with the bottom edges of the housing, along opposite sides, tracked upon the rollers during traverse motion of the housing. The screw shafts include respective nuts, which are connected to the four corners of each housing section. The nuts are adapted to shift the housing along the axis of the screw shafts upon shaft rotation, but the nuts are adapted to float radially in the vertical plane with respect to the housing. By virtue of this arrangement, the entire weight load of each housing is imposed upon the rollers which provide a fulcrum support, while the screw shafts support the housing in its extended position as a cantilever, with the forces imposed directly in tension and compression axially of the screw shafts. The arrangement provides maximum ease of operation and imparts no radial or lateral loading upon the screw shafts, which ordinarily would tend to spring or deflect them radially out of alignment and cause resistance to shaft rotation.

A further object of the invention has been to provide a system of sealing strips which is effective to form a complete peripheral weather seal between the adjoining edges of the housings and trailer body, whether the housings are fully expanded or fully contracted.

The sealing strip arrangement is such that a weather seal is established automatically whether the housings are expanded or contracted, and requires no attention from the operator of the vehicle. For this purpose, each housing is provided two complete sets of sealing strips, one set being disposed along the external plane and the second set being disposed along the internal plane of the housing. The respective sets of strips face one another and compressively engage a flange extending inwardly from the side wall of the trailer body when the housing is fully expanded or contracted.

Another object of the invention has been to provide an improved flooring arrangement for each shiftable housing which, when the housing is in extended position, forms a coextensive and flush extension of the fixed floor of the trailer body as an integral part thereof, and which is conveniently shifted to a retracted position when the housing section is contracted.

One of the important aspects of the invention, as noted above, resides in the nesting arrangement of the two housings. In contracted position, they reside compactly within the body and around the equipment or fixtures on the trailer floor from opposite sides. For this purpose, the inner side and bottom of each box-like housing section is open, and a respective floor section is hinged to the trailer floor along opposite side edges adapted to fit into the bottom of the housing. The open bottom of each housing is provided with a marginal flange projecting inwardly, and the hinged floor section rests upon the flange in flush relationship with the trailer floor. As noted above, each housing is supported by the rollers, which bear the weight load, and the hinged floor section additionally serves to impart rigidity when lowered into the extended housing. Appropriate sealing strips are provided between the housing and hinged floor section to provide a complete weather seal therebetween when the floor section is lowered. In retracted position, each floor section occupies a plane slightly inclined outwardly from the vertical and resting against the adjacent side wall of the contracted housing; thus the sections are free to drop gradually to horizontal position as the housings are shifted outward toward expanded position.

Another feature of the invention resides in an arrangement of drop-out hooks which support the drop floor sections temporarily in raised position to facilitate the operation of contracting the housings. These hooks drop out automatically by engagement of the side walls of the housings against the drop floors when the housings approach their contracted position and this allows them to assume their horizontal position automatically when the vehicle is later expanded.

Various other features and advantages of the invention will be more fully apparent from the following detailed description in conjunction with the drawings.

General arrangement

Figure 1:
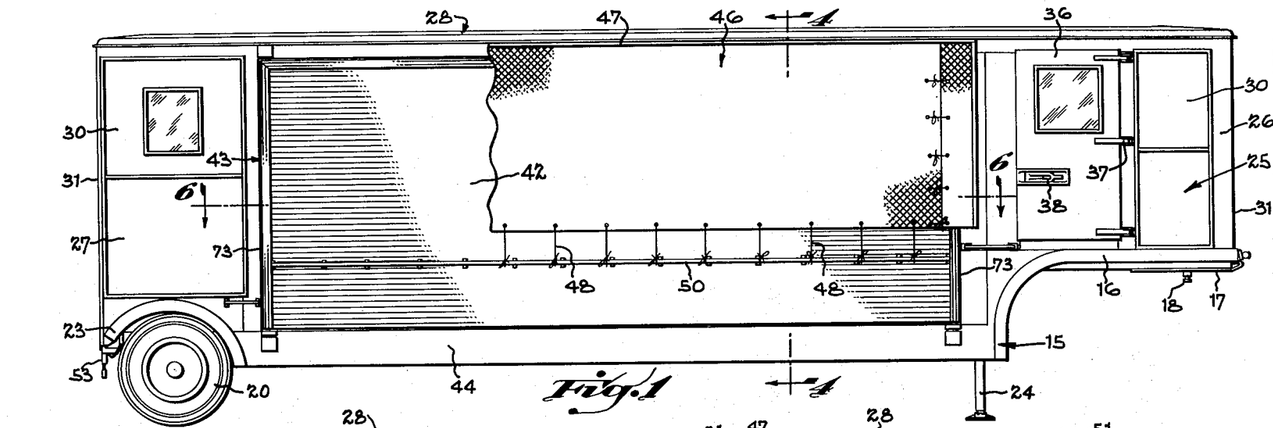
Figure 1 is a general side elevation of a semi-trailer having an expansible body constructed according to the principles of this invention.
Figure 2:
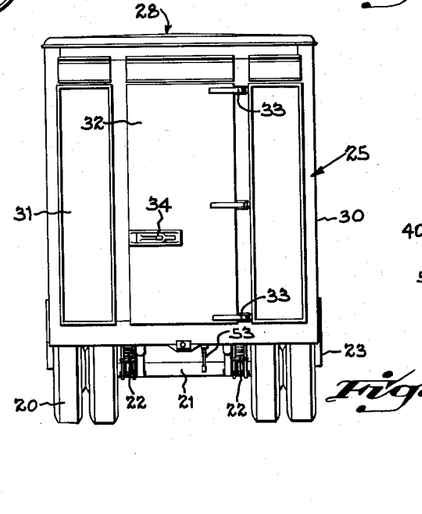
Figure 2 is an end view of the vehicle shown in Figure 1 with the expansible body in normal contracted condition for road service.
Figure 3:
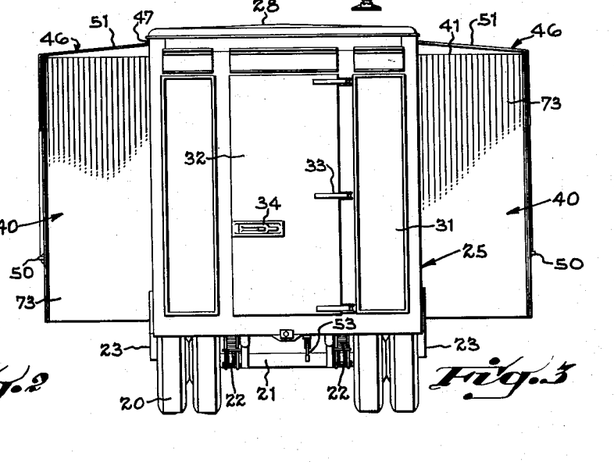
Figure 3 is a view similar to Figure 2, with the body in expanded condition.

Referring to Figures 1, 2 and 3, the invention is illustrated in conjunction with a semi-trailer which is adapted to be coupled to a tractor in the usual manner for transport as a highway vehicle of standard width. It will be understood, that the structure can be incorporated without substantial change, in truck bodies and also in four-wheel trailers, as distinguished from semi-trailers. In the present disclosure, the forward end of the body is supported upon a landing gear or prop when the vehicle is uncoupled and expanded, while in the case of trucks and four-wheeled trailers, the vehicle will rest upon its wheels when in expanded condition.

Upon reference to Figure 2, it will be noted that the body in its contracted position has approximately the same width dimension as a normal vehicle, adapted it for highway transport and that in its expanded condition, as shown in Figure 3, the body is approximately twice as wide, with the expansible housing sections overhanging the body in cantilever fashion on opposite sides.

Referring to Figure 1, the semi-trailer embodies a chassis or frame indicated generally at 15, which is constructed of structural members, the frame being of the type known in the industry as a "drop frame" in which the forward end, indicated at 16, is disposed in an elevated plane to accommodate the fifth wheel of the tractor. As shown, a trailer fifth wheel 17, which includes a king pin 18, is mounted on the forward end of the frame to provide the coupling engagement with the tractor fifth wheel. The trailer fifth wheel is of conventional design and the king pin 18 is arranged to be engaged by the coupling jaws of the tractor fifth wheel to provide draft connection in the usual manner.

The rearward end of the trailer is provided with road wheels 20, which are mounted upon a rear axle 21 (Figure 2) which is shackled to the frame by leaf springs 22—22 to support the rearward end of the trailer. As best shown in Figure 2, the wheels are of the dual type and are disposed within the vertical side planes of the body in the usual manner. In order to provide clearance for the wheels, the frame is provided on opposite sides with wheel housings, indicated at 23 in Figures 1 and 7. These housings rise upwardly from the floor within the interior of the vehicle at the rearward end; however the wheel housings are located rearwardly from the expansible housing sections in order to provide clear floor space.

The forward end of the trailer is supported by the landing gear or prop 24, which extends downwardly from the frame. The landing gear is also of conventional design and is not disclosed in detail; however, it is provided with actuating means and may be shifted by a crank or the like to extended or retracted position, and is shown in its extended position in Figure 1. The landing gear thus supports the trailer in level position for stationary use with the forward end at the proper elevation to allow the tractor fifth wheel to slide under the trailer fifth wheel for coupling purposes. After being coupled, the forward end is supported upon the tractor and the landing gear 24 is then retracted to provide road clearance.

The trailer body is mounted upon the frame 15 and includes a trailer body, which is indicated generally at 25 in Figures 1 and 3, and which is mounted in fixed relation to the frame 15. The fixed body 25 includes a forward compartment 26 and a rearward compartment 27 which are connected together by a fixed roof 28, and floor 29. The forward and rearward compartments each include fixed side walls 30—30 and end walls 31—31. As shown in Figure 2, the rearward compartment is provided with a door 32 which is hinged as at 33 to the rear wall and which includes a latch 34 for holding the same in closed position. The curb side of the forward compartment is also provided with a door indicated at 36 which is hinged as at 37 and provided with a latch 38 similar to latch 34. The rear door 32 opens to the floor level of the vehicle between the wheel housings 23 and provides convenient access to the vehicle when the expansible sides are in extended position.

The expansible housing sections, which are indicated generally at 40—40 in Figure 3, slide laterally with respect to the fixed body within an opening delineated by the forward and rearward compartments 26 and 27 and by the floor and roof, as explained later in detail. As shown generally in Figures 4 and 6, each expansible housing section 40 includes its own roof 41, side wall 42 and end walls 43—43. When the housing sections are in contracted position, their side walls 42 reside in flush relationship with the side walls 30—30 of the trailer body and inwardly from the side or rub rail 44 of frame 15.

Figure 4:
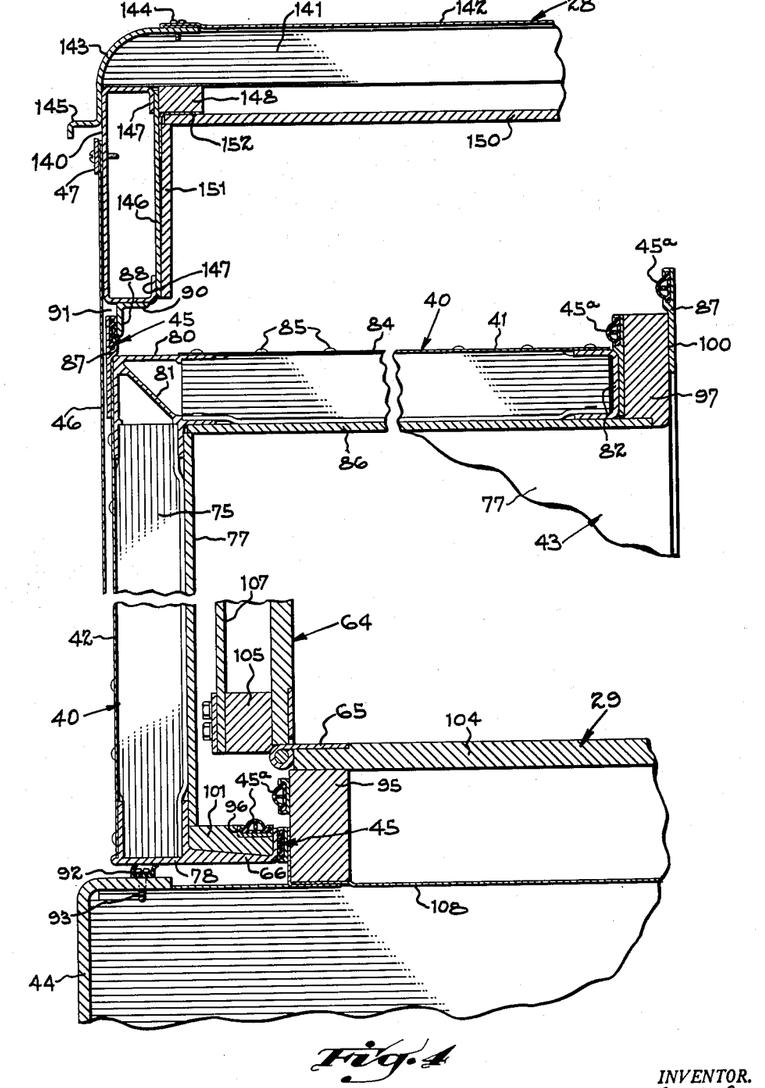
Figure 4 is an enlarged fragmentary sectional view taken on line 4—4, Figure 1, detailing the structure of the body along one side, with the expansible housing or body section in contracted position.
Figure 5:
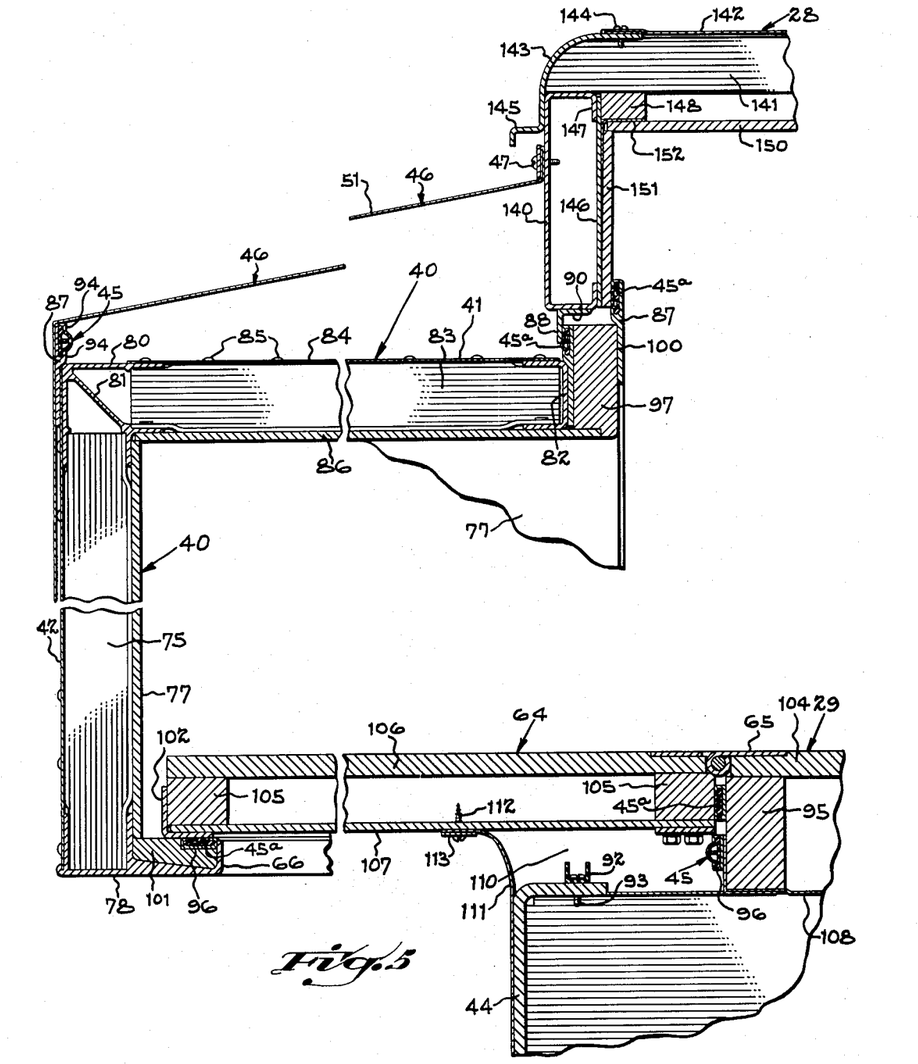
Figure 5 is a view similar to Figure 4 showing the housing in expanded position.
Figure 6:
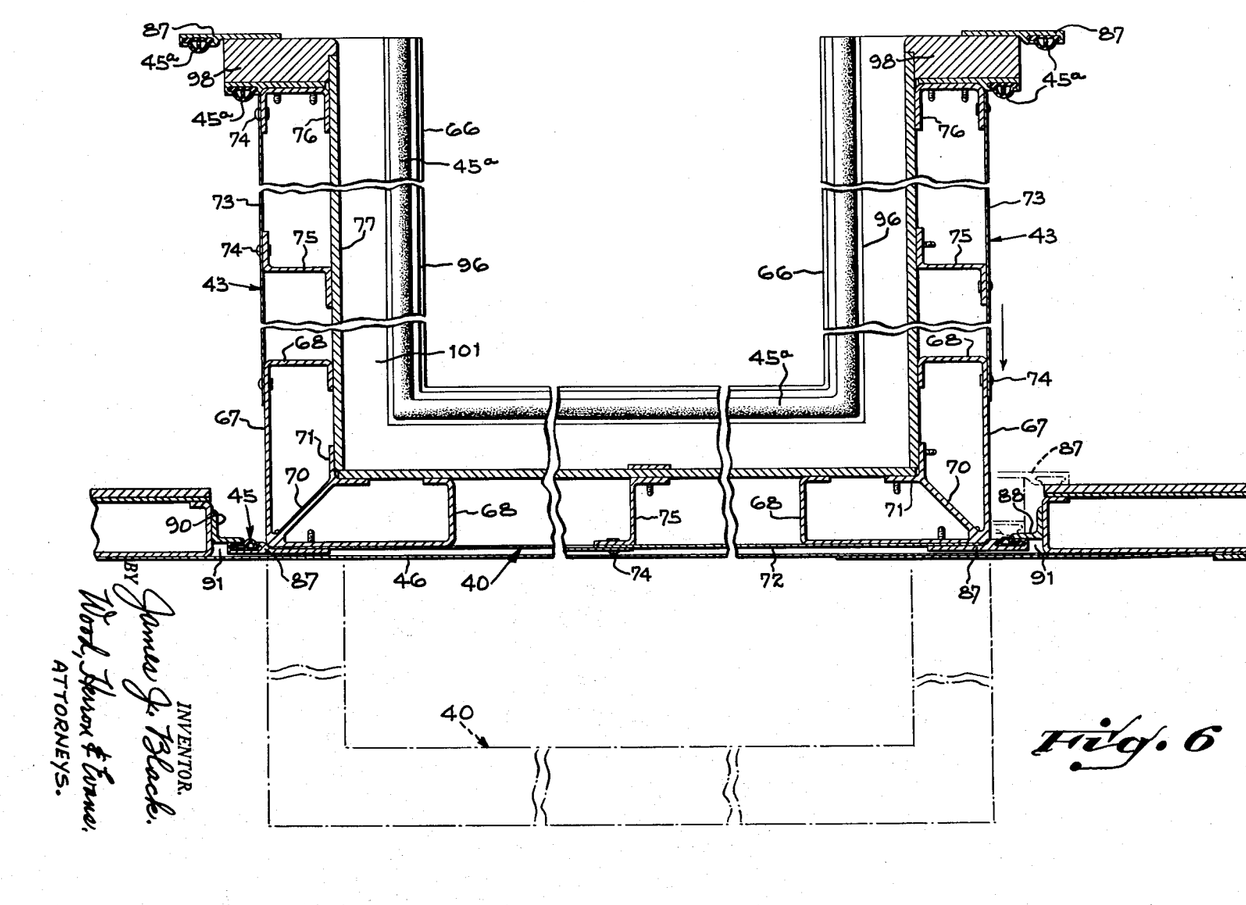
Figure 6 is an enlarged fragmentary sectional view taken on line 6—6, Figure 1, showing in plan the expansible housing section contracted with respect to the trailer proper.

As described later in detail, a weather seal, indicated generally at 45, is provided around the entire periphery of each expansible housing section, with respect to the trailer body when in contracted position, as shown in Figures 4 and 6. When the expansible housing is in extended position, as shown in Figure 5, a second weather seal, indicated generally at 45a, is also provided around its entire periphery with respect to the trailer body.

Each expansible section consists of a complete box-like unit including a roof, and each section is further protected by means of a sheet of tarpaulin 46, which extends across the roof and partially down the sides of the housings when they are expanded, as shown in Figure 3. The tarpaulin has its upper edge fastened as at 47 (Figure 5) to the side wall section 30 of the body beneath the roof and has its lower edge secured by means of cords 48, which are anchored to a rail 50 extending horizontally across the side wall of the expansible housing.

When the housings are to be expanded, as shown in Figure 3, the cords are untied, allowing the depending portions of the tarpaulin to slide upwardly and provide the temporary roof sections indicated at 51—51, which overlie the roof 41 of the housings. After expanding the housings, the cords 48 are again tied to the rail to hold the tarpaulins in position. The purpose of the tarpaulins is to prevent snow and ice from accumulating upon the roof of the expansible housings, which would interfere with normal operation when it is necessary to contract them.

Figure 7:
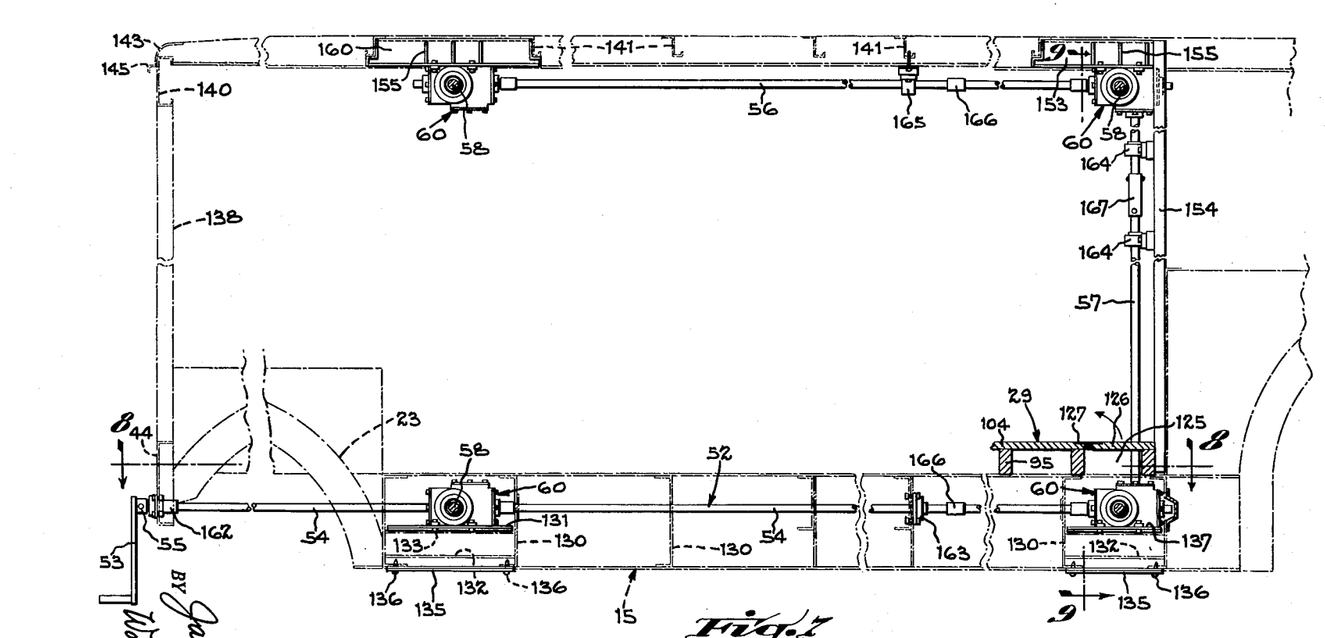
Figure 7 is a sectional view generally similar to Figure 1, illustrating the body expanding mechanism in relation to the trailer structure, which is shown in broken lines.
Figure 13:
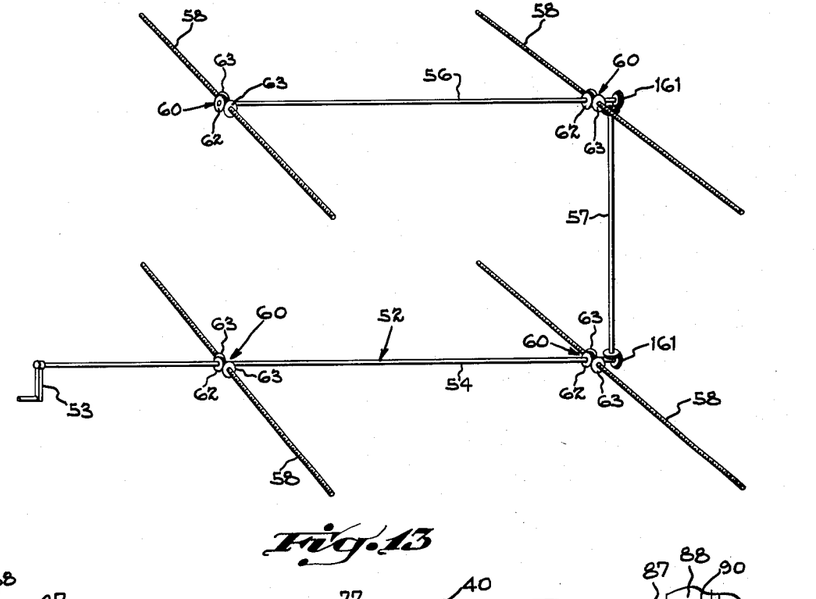
Figure 13 is a diagrammatic perspective view illustrating the general arrangement of the body expanding mechanism.

As illustrated diagrammatically in Figure 13, the housings are shifted to expanded or contracted position by means of the body expanding mechanism indicated generally at 52, which in the present instance is manually operated by means of a crank 53. Crank 53 is located at the rear of the trailer body as best shown in Figure 7, and is detachably secured to the drive shaft 54 by means of a bolt 55 passing through the hub of the crank. When the crank is not in use, it is preferably detached from the drive shaft and placed suitably inside the trailer.

Figure 8:
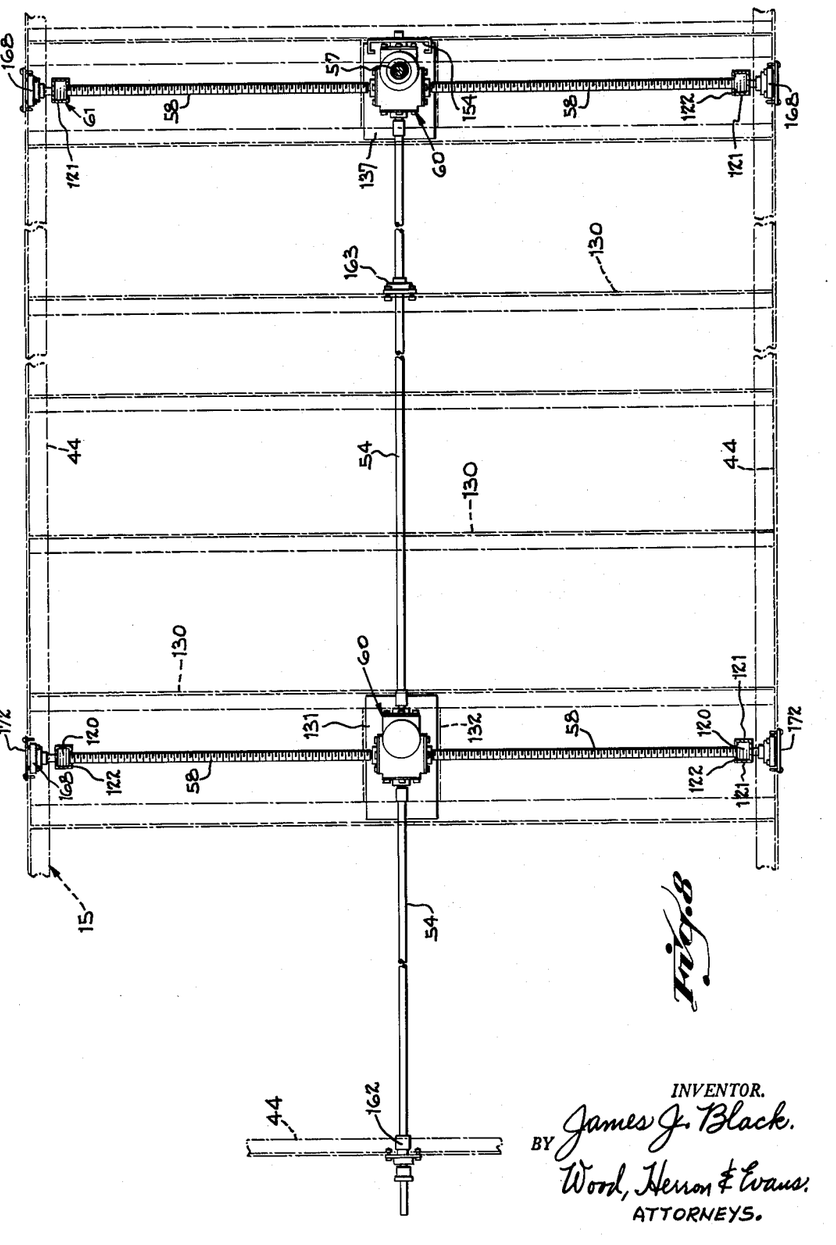
Figure 8 is a sectional view taken on line 8—8, Figure 7, illustrating in plan the body expanding mechanism in relation to the trailer structure.

As viewed from the side as in Figure 7, the driving system for the screw shafts is generally U-shaped, consisting of the lower shaft section 54 and an upper section 56, the two sections being in driving connection with one another by means of the vertical branch shaft indicated at 57. By this arrangement the rearward end of the system is open and does not obstruct in any way the interior or floor space of the vehicle. It will be noted that the lower shaft section 54 is located beneath the floor 29 and that the sections are disposed along the longitudinal axis of the vehicle as shown in Figure 8.

The transverse screw shafts 58 extend coaxially in opposite directions outwardly from the gear boxes indicated generally at 60. As shown in Figure 7, there is provided a set of four gear boxes mounted in pairs at the top and bottom of the vehicle. The screw shafts extend outwardly from the opposite sides of each gear box and are in threaded engagement with the four corners of the respective housings 40 by means of the nut assemblies indicated generally at 61 in Figure 9. In the present structure, the drive shafts 54, 56 and 57 provide a driving connection to the four gear boxes and drive all of the screw shafts in unison upon rotation of the crank.

The gear boxes are not illustrated in detail, however, as indicated in Figure 13, each includes a bevel gear 62 keyed to one of the drive shafts and meshing in common with a pair of bevel gears 63—63, which are keyed upon the inner ends of coaxial screw shafts. This arrangement drives the coaxial, outwardly extending screw shafts of each gear box in respective opposite directions upon rotation of the crank. The lead of the screw threads of each pair of coaxial screw shafts is in the same direction, thus causing the nut assemblies of the respective screw shafts to be shifted outwardly or inwardly in unison depending upon the direction of rotation of the crank. Thus the four screw shafts on each side of the vehicle are arranged to stabilize the expansible housings as they are moved equidistantly in opposite directions while the body is expanding or contracting. The various structural details of the driving system and its relationship to the expansible housings is explained later in detail.

*Expansible housings*

As explained earlier, each expansible housing section comprises a complete unit including a roof, side walls and end walls, and is shiftable as a unit with respect to the trailer body upon operation of the body expanding mechanism. In order to provide a floor which is in plane with the fixed floor of the trailer, respective hinged floor sections, as indicated at 64 in Figures 4 and 5, are provided for the expansible housings. The hinged floor sections are connected by piano type hinges 65 to the main floor 29, and are arranged to occupy a compact vertical position, as shown in Figure 4 adjacent the side wall of the expansible housings when the housings are in contracted position. Upon being expanded, each floor section is swung downwardly to the position shown in Figure 5 with its outer edge resting upon and supported by a flange 66 formed along the lower edge of the expansible housings.

Described in detail with respect to Figure 6, each expansible housing comprises a frame having vertical corner posts 67 formed of metal, each post including the channel section 68—68 at respective opposite ends. Each corner post further includes a diagonal web 70 extending from the outer corner inwardly and having a corner flange 71 formed thereon. The corner posts 67 thus provide a spacing member upon which is mounted the sheet metal side wall panel 72 and the end wall panels 73—73, the panels forming the external surface of the housing. The panels 72 and 73 are secured to the corner posts by means of the rivets indicated at 74. In addition to the corner posts, each expansible housing further includes intermediate vertical stud members 75, which are generally Z-shaped in cross-section as viewed in Figure 6. The opposite ends of each housing are provided with posts 76, which are generally U-shaped in cross-section. The vertical posts and studs thus provide spaced flanges for securing the external sheet metal panels in spaced relationship to the internal panels 77, which may be formed of plywood or other appropriate material.

As viewed in Figure 5, the vertical posts 67, 75 and 76 have their lower ends joined to a horizontal framing member 78, which is generally U-shaped in cross-section and which extends around the three sides of the housing and includes the floor supporting flange 66 previously noted. A framing member 80 also extends along the upper corner of the expansible housing between the end walls. The member 80 is generally similar in cross-section to the corner posts 67 and includes a diagonal bracing member 81 extending to the interior walls to provide rigidity.

The roof of the expansible housing, as shown in Figure 5, includes a horizontal support beam 82, which is U-shaped in cross-section and which spans and supports the inner edge of the roof. The opposite ends of the beam 82 are joined to the tops of the end posts 76 and thus supports the open end of the roof structure. As shown in Figure 5, the roof structure further includes a series of horizontal beams 83, which correspond in cross-section to the intermediate vertical studs 75 above described. The top panel 84 of the roof is similar to the sheet metal side and end wall panels and is secured to the structural members by means of the rivets indictaed at 85. An internal panel 86, similar to the wall panels 77 above noted, is secured to the roof beams.

In order to provide a weather seal when the housing section is in contracted position, as shown in Figure 4, the top framing member 80 of the roof includes a metal seal mounting strip 87, upon which is mounted the peripheral sealing strip previously indicated at 45. This structure extends across the top and along the opposite vertical end walls of the section as indicated in Figure 6. When the housing is in contracted position, the seal 45 engages in compression the vertical flange 88 of an angle member 90, which is secured within the opening 91 of the side wall of the trailer body. The peripheral seal is completed across the lower open edge of the expansible housing by means of the U-shaped sealing strip 92, which is mounted upon the horizontal flange of the side rail 44 and secured by screws 93 threaded into the flange.

As best shown in Figure 5, the sealing strip 45 is partially cylindrical and is hollow in cross-section to provide increased resilience. The strip is secured in place by means of the overhanging lips 94—94 formed in the metal strip 87 and overlying the marginal edges of the sealing strip.

In addition to the sealing strip 45 around the walls of the housing, a floor sealing strip 45 is secured to a longitudinal stringer 95 which forms a part of the trailer floor and is engaged by the end of the floor support flange 66 when the housing is contracted. The sealing strip is mounted in a metal retainer strip 96, which is provided with lips similar to the lips 94 above described. From the foregoing description, it will be seen that a complete weather seal is provided around the periphery of the expansible section when the section is in contracted position.

As indicated earlier, a second peripheral seal 45a is provided between the edges of the expansible housing and trailer body when the housing is shifted to its expanded position, as shown in Figure 5. For this purpose the inner edge of the housing is provided with horizontal and vertical framing members 97 and 98, as shown in Figures 5 and 6, preferably formed of wood. The respective framing members are secured to the U-shaped end posts 76 and horizontal roof beam 82. The framing members are provided with respective pairs of metal seal retaining strips identical to the seal retaining strip 87 previously described and each is provided with a similar rubber sealing strip facing outwardly and providing parallel double seals. As shown in Figure 5, the seals establish a pressure engagement with respect to the flange 88 and the internal surface of wall 100 when the housing is fully expanded. This provides a double line seal with respect to the body opening, extending across the top and along the side edges of the housing.

In order to completely seal the floor section with respect to the trailer body, a floor sealing strip 45a mounted in a metal retainer strip similar to strip 96, is interposed between the trailer floor and the hinged floor section 64. The outer edge and sides of the floor section are sealed with respect to the side and end walls of the expansible housing by means of a second floor seal 45a, which is mounted upon the flange 66, as shown in Figures 4 and 5. This seal is mounted in a retainer strip similar to strip 96. The metal strip in turn is mounted upon a wood rail 101, which is seated within the flange 66 in a position to engage the angle iron 102, which is mounted upon the edge of the floor section. The structure shown in Figure 5 is identical along lower edges of the end walls of the expansible housing and extends inwardly to the first noted floor seal 45a, thus completing the seal around the hinged floor section.

Figure 10:
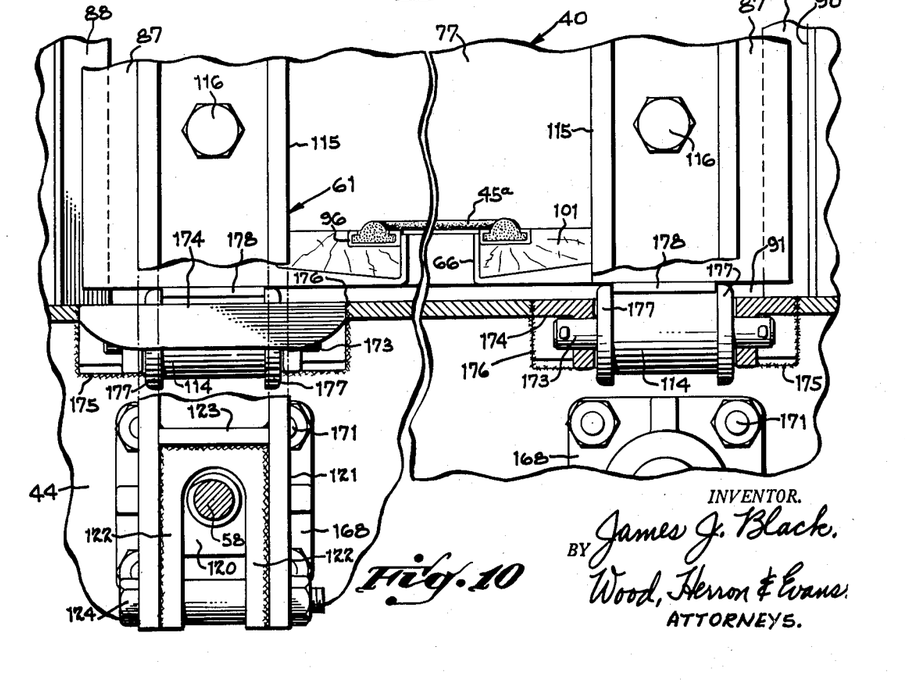
Figure 10 is a sectional view, taken on line 10—10, Figure 9, detailing the support structure for the shiftable housing sections.
Figures 11, 12, 14:
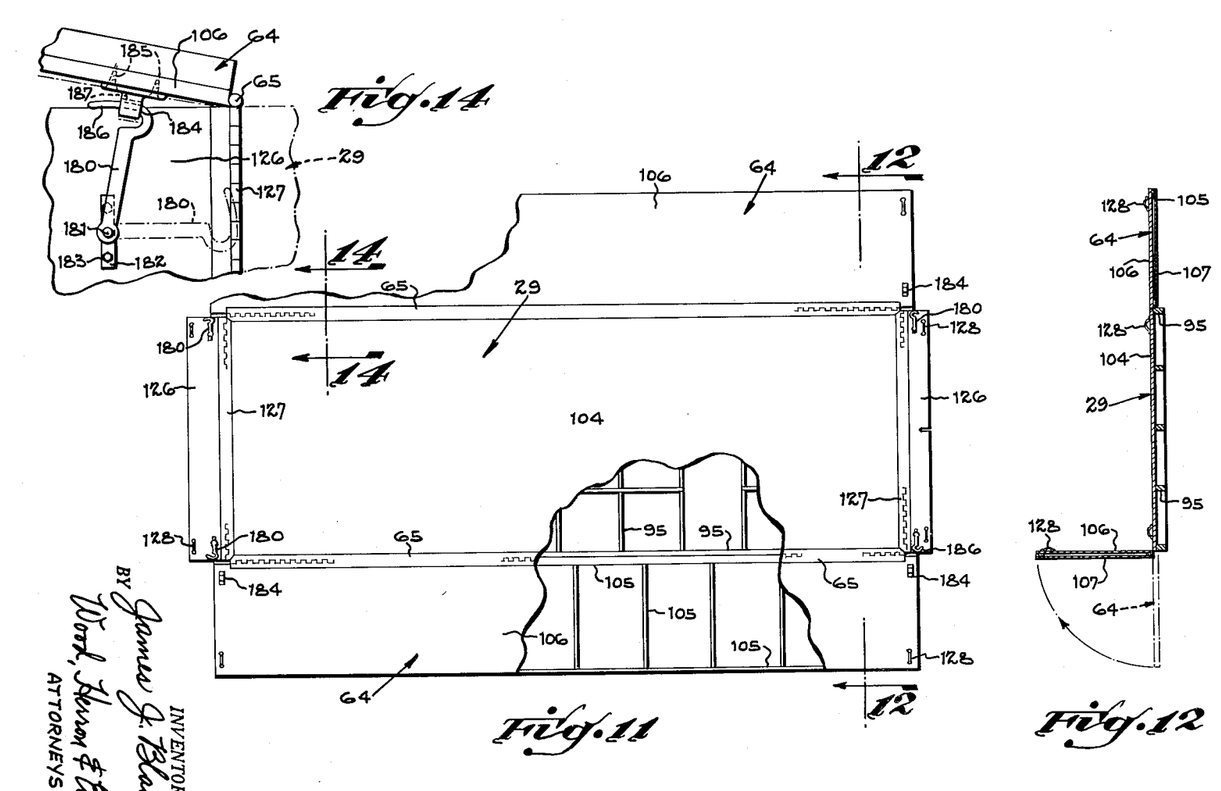
Figure 11 is a plan view illustrating the floor structure of the vehicle.
Figure 12 is a sectional view taken on line 12—12, Figure 11, further illustrating the hinged drop floor sections.
Figure 14 is a diagrammatic view as indicated along line 14—14, Figure 11, showing the drop-hook arrangement.

As indicated in Figures 10 and 11, the floor of the trailer is of conventional construction consisting of longitudinal and transverse members 103 resting upon the intermediate framing members of the chassis, and having a supporting surface of plywood or the like as indicated at 104. Each hinged floor section 64 consists of framing members 105, also formed of wood, and having a flooring panel 106 similar to the main floor of the trailer and disposed in the same horizontal plane when the hinged floor section is swung to its level position, as shown in Figure 5.

The under side of the hinged floor section is covered by a panel 107 spaced outwardly from the flooring 106 to provide a finished appearance and to provide a dead air space for heat insulating purposes. It will be noted in Figure 5 that a sheet metal panel 108 is also disposed in spaced relationship to the floor 104 of the trailer to provide a similar dead air space beneath the main trailer floor.

In order to protect the area between the hinged floor section and trailer frame, as indicated at 110 in Figure 5, a canvas or tarpaulin sheet 111 is attached to the exterior panel 107 of the hinged floor section. Sheet 111 is attached by means of screws 112 passing through a metal strip 113 which overlies the marginal edge of the sheet, the screws being threaded into the panel 107. As shown, the sheet 111 overhangs the area 110 to increase the weather proofing effect of the seals and to prevent the entry of snow and ice, which would interfere with normal operation of the weather seals 87 and 45.

From the foregoing description, it will be understood that each expansible housing and hinged floor section are arranged to cooperate with one another in expanded position to provide a completely weather proof housing by operation of the several sealing strips. It will also be apparent that the second set of sealing strips provide a complete weather seal when the expansible housing is in contracted condition as shown in Figure 4. Although the drawings and description are confined to the expansible housing structure on one side of the trailer body, it will be understood that the structure along the opposite side is identical and need not be disclosed in detail.

Body expanding mechanism

Figure 9:
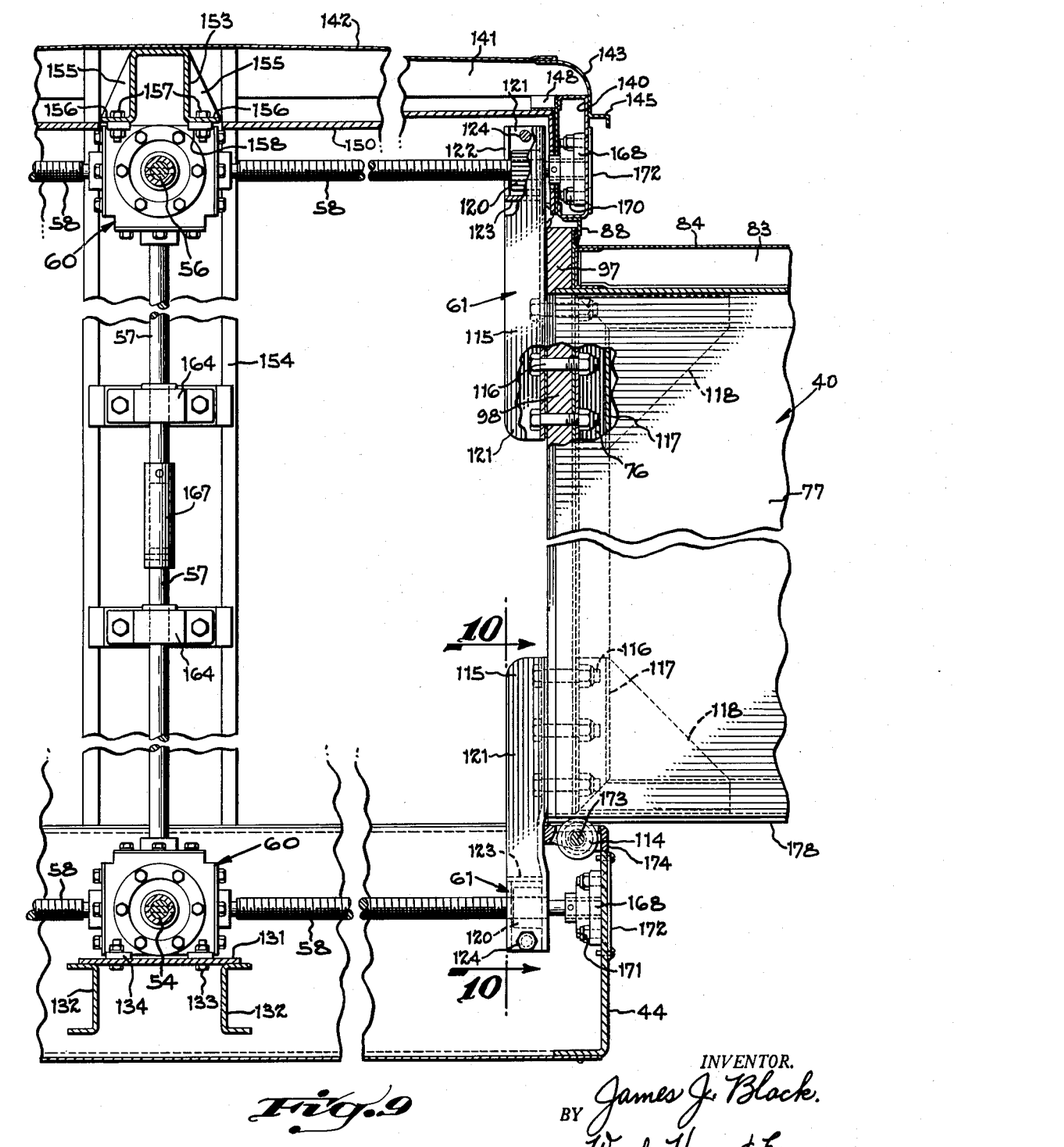
Figure 9 is a vertical sectional view taken on line 9—9, Figure 7, further detailing the body expanding mechanism and its driving connection to one of the expansible housing sections.

As previously indicated, the driving system, shown diagrammatically in Figure 13, is adapted to shift both expansible housings in unison upon operation of the crank 53. Also as pointed out earlier, the housings are connected by means of the nut assemblies 61 to the screw shafts 58 at the respective corners of each housing as indicated in Figure 9. The uniform rotation of the four screw shafts traverses the four nut assemblies uniformly and thus stabilizes the housings both in the vertical and horizontal planes during its expanding and contracting motion. Since the housings at the opposite sides of the trailer are expanded or contracted in unison, the two housings counterbalance one another with respect to the trailer body.

It will also be noted, that in expanded position, the two housings overhang the trailer body in cantilever fashion with the stresses transmitted by the nut assemblies 61 directly to the upper and lower coaxial pairs of screw shafts indicated at 58. By virtue of the overhanging effect of the expanded housings, the stabilizing forces act upon the upper screw shafts in tension and upon the lower screw shafts in compression, the weight load being imposed upon the rollers 114 which track against the lower edges of the housing section along opposite sides, as shown in Figures 9 and 10.

Described in detail with respect to Figures 8 and 9, each nut assembly comprises a vertical channel shaped member 115 which is bolted as at 116 to the vertical framing members 98 along the inner edges of the end walls, as previously described with reference to Figure 6. As shown in Figure 9 the channel members at the top extend upwardly above the roof of the housing and the channel members along the bottom extend downwardly below the plane of the housing floor. It will also be noted that the upper and lower corners of the housing sections are provided with reinforcing angle brackets 117—117 which are inserted within the vertical posts 76 at the upper and lower end portions, being secured to the posts and to the wood framing members 98 by means of the bolts 116. The horizontal limbs of the angle brackets are secured by welding or other means to the horizontal roof beams 83 and the two limbs of each bracket are reenforced by the web 118 which extends diagonally between them.

The outer ends of the respective channel members 115 each include a respective nut 120 which is threaded upon the upper and lower screw shafts. Each nut is square and is confined radially between the limbs 121—121 of the channel member and is restrained against axial displacement by means of the flanges 122—122, which are bent inwardly from the limbs and engage the inner face of the nut. The outer end portion of each channel member is reenforced by means of a plate 123 which is spaced inwardly from the nut and joined to the channel member by welding.

Each nut is locked against rotation by the channel member which confines it and is restrained against axial motion relative to the channel. However, the nuts are free to float in the vertical plane relative to the channel members so as to avoid imposing the weight load of the housings radially on the screw shafts. As noted earlier, the entire weight load is carried by the spaced rollers 114 which support the housings along a line extending longitudinally of the housings and which forms a fulcrum support, while the screw shafts stabilize the housings directly in tension and compression. In order to strengthen the outer ends of the limbs 121—121 and prevent spreading due to the forces acting upon them, a respective bolt 124 passes through the limbs adjacent the reinforcing plates 123. The bolts include nuts (not shown) on their outer ends, the limbs 121 being confined between the heads and nuts; however a clearance is preserved between the limbs and nut in order to provide the floating connection noted above.

It will be noted in Figure 9, that the lower nut assemblies project downwardly below the plane of the trailer floor 104 to the lower screw shafts which are disposed beneath the floor. For this purpose, a transverse tunnel indicated at 125 in Figures 7 and 11, is provided at the forward and rearward ends of the fixed floor. As explained later, the screw shafts and their gear boxes are housed within the tunnels 125 for weather protection and the respective tunnels are sufficiently wide to provide clearance for the forward and rearward nut assemblies as they traverse the screw shafts. Each tunnel is provided with a transverse floor section 126, which is hinged to the main floor as at 127 and provided with handles 128.

When the expansible housings are contracted, the hinged sections are swung to open position to accommodate the nut assemblies and when the sections are fully expanded, the sections are swung to closed position, as shown in Figures 7 and 9. The transverse floor sections extend for the full width of the trailer body and their outer ends adjoin the nut assemblies, as shown in Figure 9, when the housings are expanded and the floor sections closed.

It will be understood from the foregoing that the forces imposed upon the screw shafts by the expanded housings are transmitted by the screw shafts to the respective gear boxes 60, which are mounted in pairs upon the trailer frame and upon the roof bow structure. As best shown in Figure 8, the respective upper and lower pairs of gear boxes 60 are located upon the longitudinal axis of the trailer frame, the lower gear boxes being disposed below the floor level and the upper gear boxes being located below the ceiling, as shown in Figure 7.

Referring to Figure 8, it will be noted that the trailer chassis 15 is provided with a series of cross members 130, which consist of channel shaped structural members having their opposite ends welded or otherwise secured to the side members. The lower gear box at the rearward end is fastened upon a mounting plate 131, which is interposed between an adjacent pair of cross members 130. The mounting plate is secured by means of channel members 132–132, having their opposite ends welded or otherwise secured to the cross members (Figure 9). The mounting plate 131 is welded to the channel members and the gear box is secured to the mounting plate by means of bolts 133 passing through the gear box lugs 134.

The spaced cross members 130 delineate the tunnel 125 extending transversely through the chassis and thus forms an enclosure for the screw shafts and gear boxes. In order to protect the parts from the weather, a bottom closure plate 135 is secured to the lower webs of the cross members 130 by means of the screws 136. This plate extends transversely for the full length of the tunnel for weather protection.

The lower gear box at the forward end is mounted between a similar pair of adjacent cross members upon a mounting plate 137, which is secured in a similar manner to the cross members which form the second tunnel 125. This structure is substantially the same as the rearward assembly and need not be described in detail.

The roof structure extends longitudinally across the forward and rearward compartments 26 and 27, which include vertical corner posts 138, as indicated in Figure 7. In general the roof structure comprises a marginal channel 140 (Figures 7 and 9), extending along the sides and ends of the body. The posts 138 are welded to the framing members of the floor and roof and suitably reinforced for stiffness. The channel 140 thus provides a beam extending across the openings 91 and supports the cross beams 141 (Figure 7) of the roof bow structure. The beams 141 are channel or Z-shaped in cross section, having their opposite outer ends welded or otherwise secured upon the upper surface of the spaced longitudinal channel members 140, as shown in Figure 9.

As shown in Figures 4, 5 and 9, a roof panel 142 formed of sheet metal is secured upon the upper surface of the cross beams 141 and outer edges of the panel are secured to the edge of the curved corner sections 143 by means of screws 144. The lower edge of each corner section is provided by a drip flange 145 which overhangs the side wall of the body to provide drainage of water. The channel 140 is stiffened by means of an internal plate 146 which is preferably welded to the inturned flanges 147–147.

Beneath the roof beams 141 there is provided a series of longitudinal stringers 148, the internal ceiling panels 150 being secured to the stringers 148 preferably by wood screws. Side panels 151, which may also be formed of wood are secured upon the internal surface of the wall panel 146. The adjoining edges of the wall and ceiling panels are preferably sealed with respect to one another by means of the sheets 152 which are interposed between the margins of the panels and their mounting surface.

As best disclosed in Figures 7 and 9, the upper gear box 60, at the forward end of the trailer, is secured to a mounting bracket 153 which is fastened to the roof beams 141 and to a vertical column 154. The 154 is generally channel shaped in cross section, as shown in Figure 8, and is welded or otherwise secured at opposite ends to the floor frame and roof bow structure. As best shown in Figure 9, the bracket 153 is generally of inverted U-shape in cross-section and is stiffened by a series of gussets 155 spaced along the bracket at opposite sides. The bracket further includes a pair of horizontal flanges 156—156 extending horizontaly from its open lower side and joined to the gussets by welding. The gear box 60 is secured to the flanges 156—156 by means of bolts 157 which pass through the flanges and through the lugs 158 formed on the gear housing.

The upper gear box 60 at the rearward end of the trailer is mounted upon a bracket 160 which is generally similar to the forward bracket 153. Bracket 160 is secured between an adjacent pair of roof beams 141—141, as shown in Figure 7. The gear box is secured in a similar manner by bolts passing through the flanges and lugs as above described. From the foregoing, it will be understood that the mounting brackets 153 and 160 provide a rigid mounting structure for the upper gear boxes in order that they may resist the stress imposed upon the screw shafts, particularly when the housings are in expanded position.

As explained earlier with reference to Figure 13, the gear boxes include the bevel gears 63 which are keyed to the screw shafts and which are in mesh with the driving gears 62. The driving gears are keyed upon the respective drive shafts and branch drive shafts so as to provide unitary rotation of all the screw shafts of the system upon rotation of the crank. In addition, the gear boxes at the forward end include a fourth bevel gear indicated at 161, which provides a driving connection between the horizontal and vertical drive shafts.

As noted earlier, the coaxial screw shafts, which extend outwardly from opposite sides of the gear boxes, are rotated in opposite directions relative to one another by virtue of the bevel gear drive. For this reason, the threads of the coaxial screw shafts of each gear box lead in the same direction; in other words, they are both right threads or left hand threads, as required. Therefore, upon reverse rotation of the respective coaxial screw shafts, the upper and lower nut assemblies at opposite sides, are traversed in unison toward or away from one another.

The detailed construction of the gear boxes is not essential to an understanding of the invention and for this reason, such disclosure has been omitted. It will be understood, however, that the gear boxes include appropriate thrust bearings journalling the screw shafts and also appropriate bearings for the respective driving shafts.

As best shown in Figure 7, the rearward end of the drive shaft 54 passes through the main cross member 44 of the chassis and is rotatably journalled in a bearing 162 which is bolted to the cross member. The intermediate cross members 130 of the floor structure also include aligned openings through which the shaft extends forwardly to the gear box at the forward end of the trailer. A bearing 163 is secured to one of the cross channels to provide intermediate support for the extended drive shaft.

The vertical branch of the drive shaft 57, which extends from the lower to the uper gear box, is journalled in bearings 164—164, which are bolted to the vertical column 154 to provide intermediate support. A similar bearing 165 is anchored upon one of the roof beams to provide intermediate support for the horizontal branch 56 of the drive shaft which extends to the upper rearward gear box. In the preferred construction, the branch drive shafts are sectional and the sections are connected to one another by the couplings 166—166 in the horizontal shafts and by the coupling 167 in the vertical shaft, as shown in Figure 7.

As best shown in Figures 8 and 9, the outer end of each screw shaft is journaled in a bearing 168 which is mounted in the trailer frame structure. The bearings 168 for the upper screw shafts 58 are secured by bolts 170 to the longitudinal roof channel member, 140 which is reinforced by the roof bow structure and provides a rigid support. The bearings 168 for the lower screw section 58 are secured by bolts 171 to the longitudinal channel member 44 of the chassis. It will be apparent therefore, that the upper and lower screw sections are confined against axial thrust at opposite ends by the bearings 168 and by the thrust bearings which are incorporated in the gear boxes.

As indicated in Figure 9, the roof channels 140 and chassis side rails 44 are each provided with removable plates 172 covering the heads of the bearing mounting screws 170 and 171, which are countersunk. These plates may be removed if necessary to apply lubricant to the bearings, the respective frame members having openings formed therein to expose the ends of the screw shafts upon removal of the plates.

As explained earlier, the side rails 44 of the chassis are provided with respective pairs of rollers 114 which track against the bottom of the housing sections along opposite sides. As shown in Figures 9 and 10, each roller is loosely journalled upon a shaft 173, having its outer ends mounted in a bracket 174 which is welded as at 175 to the web and top flange of the side rail 44. It will also be noted that the roller projects upwardly above the plane of the top flange of the side rail, the rail being notched as at 176 to accommodate the bracket and roller. In its preferred form, as shown in Figure 10, the roller is provided with side flanges 177—177 and the lower edge of each housing end wall is provided with a tracking rail 178, which rides upon the roller between its side flanges. This prevents the housing section from shifting lengthwise of the trailer body within its opening.

It will be apparent from Figure 7, that the entire weight load of the housing is imposed at opposite ends upon the rollers, while the housing is stabilized laterally by the upper and lower screw shafts. In other words the rollers provide a fulcrum support for the housing, while the cantilever forces of the housing act directly along the axes of the upper and lower screw shafts with no radial forces imposed upon the shafts, by virtue of the floating connection of the nuts. When the housings are expanded, the upper screw shafts are in tension and the lower shafts are in compression.

When the screw shafts are rotated to contract the housings, it will be apparent that the cantilever effect decreases as the nut assemblies move inwardly along the screw shafts toward the gear boxes. By way of example, when the housings have travelled approximately one-half the total distance inwardly, the weight load will be substantially balanced upon the rollers 114 with practically no axial stress imposed upon the screw shafts. As the nut assemblies move beyond the halfway mark, and approach the gear boxes, then the housing sections begin to overbalance inwardly, causing a reversal of the axial forces acting upon the screw shafts. At this point the upper shafts are in compression, with the lower shafts in tension. These forces increase progressively as the nut assemblies approach the gear boxes, and are at maximum when the housings are fully contracted; however, at no point during operation are the screw shafts subjected to radial loading.

It will be understood that the two housing sections are expanded and contracted at a uniform rate along the opposite sides of the trailer and that the vehicle remains in balance transversely whether the housings are expanded or contracted. It will also be noted that the tension and compression forces acting upon the screw shafts are opposed to one another on the respective opposite sides of the driving system and thus substantially neutralize one another. Thus the gear boxes and bearings are not subjected to great stresses at any time and theoretically, at least, all the tension and compression forces are absorbed within the screw shaft system, and are not transmitted to the structural parts of the trailer frame.

The operation of expanding or contracting the housing sections may be executed rapidly and conveniently, since the housings are self-supporting and require no outboard props or other supporting structure when expanded. The floating relationship of the nuts upon the screw shafts prevents the imposition of binding forces and other excessive pressures upon the screw threads, such that turning resistance and wear is reduced to minimum with consequent easy operation of the mechanism. In contracted position, the body expanding mechanism and its associated parts, clamps the housings securely in telescoped position within the trailer body and in sealing engagement with the walls to prevent vibration or looseness while the trailer is in transit.

It will also be understood that the sealing strips are under direct compression with their mating flanges by the pressure supplied by the screw shafts whether the housings are in expanded or contracted position. The seal construction, particularly along the roof line of the housings, thus functions both as a weather tight joint and as a partial support for the housings whether they are fully expanded or fully contracted.

According to the construction disclosed, the longitudinally hinged floor sections assume a generally vertical position as shown in Figure 4 when the housings are contracted. However, they are overbalanced slightly in the outward direction such that they will swing outwardly in an automatic manner as the housings are expanded until they rest in horizontal position upon the floor flanges of the housings and in flush relationship with the main floor. This arrangement thus facilitates the operation of expanding the housings and converting the trailer for use.

For convenience in contracting the housings, a hook and eye arrangement holds the hinged drop floor sections temporarily in outwardly inclined vertical position while the housings are being contracted. Upon being fully contracted, the hooks disengage themselves from the eyes automatically, leaving the side and end drop floor sections leaning against the side and end walls of the expansible housings. Therefore, upon shifting the sections outwardly to their expanded positions, the drop floor sections along the sides will follow the housings and gradually assume their horizontal positions while the end drop floors will drop down when the edges of the housing walls pass beyond the ends of the drop sections.

As shown in Figures 11, 12 and 14, each end drop floor 126 is provided with a hook 180 pivotally mounted as at 181 upon a block 182 which is bolted as at 183 to the floor near its outer end. The side drop floors 126 are each provided with a pair of hook receivers or eyes 184 which are secured by screws 185 to the side drop floors in positions to be engaged by the curved portions 186 of the hooks. Each eye is provided with a hole 187 which is sufficiently large to receive the curved portion of the hook with adequate clearance. It will be noted that the hook is frictionally held in its engaged position as shown and that it is free to drop by gravity to the position indicated in broken lines when released.

When the expansible housings are to be contracted, the side and end drop floors are elevated by means of the handles 128 and the hooks are then engaged in the eyes as shown in Figure 14. This supports the side drop floors in the angular plane as indicated, and also supports the end drop floors in positions inwardly of the end walls of the housings to provide clearance for the walls as the housings move in toward one another. As the housings approach their final contracted positions, the side walls contact the outer ends of the side drop floors and shift the drop floors upwardly, as indicated by the broken line, causing the frictional engagement of the hooks to be released. This causes the hooks to drop by gravity as indicated, thus leaving the side and end drop floors resting against the respective walls of the housings ready to drop to horizontal position in an automatic manner when the housings are again expanded.

I claim:

1. An expansible vehicle body comprising a vehicle frame, an expansible housing slidably mounted within said vehicle frame, said housing adapted to be shifted transversely with respect to said vehicle frame, a pair of upper and lower horizontal screw shafts rotatably journalled in said vehicle frame and extending transversely thereof, respective nuts in threaded engagement upon said screw shafts and adapted to be shifted axially along said shafts upon rotation of the shafts, a pair of upper and lower driving members attached to the expansible housing and extending toward said screw shafts, means on said connectors slidably engaging the nuts for advancing the driving members along the axes of the screw shafts, said means providing vertical floating of the driving members relative to the nuts, said connectors shifting said housing transversely along a generally horizontal plane upon rotation of said screw shafts, rollers mounted upon the vehicle frame and in tracking engagement with said housing, said rollers providing a fulcrum support bearing the weight load of said housing with the housing stabilized transversely by said screw shafts along the axes thereof, and means for rotating said screw shafts in unison whereby said nuts are effective to shift said housing transversely of the vehicle frame.

2. An expansible vehicle body comprising, a vehicle frame, a pair of expansible housings slidably mounted within said vehicle frame, said housings adapted to be shifted transversely with respect to the opposite sides of said vehicle frame, a plurality of generally horizontal screw shafts rotatably journalled in said vehicle frame and extending transversely thereof, respective nuts in threaded engagement upon said screw shafts and adapted to traverse said shafts upon rotation of the shafts, driving members connecting said nuts to said housings, said driving members confined upon said nuts in the direction of nut traverse and floating relative to the nuts in a direction radial to the axes of the screw shafts, said driving members adapted to shift said housing transversely in unison and in opposite directions along a generally horizontal plane upon rotation of said screw shafts, housing support means mounted upon the vehicle frame and in engagement with said housing along opposite ends, said support means providing fulcrum supports shiftably bearing the weight load of said housings with the housings stabilized laterally by said screw shafts, and means for rotating said screw shafts, whereby said nuts are effective to shift said housings transversely, said housings in extended position being supported by said support means in cantilever fashion with the stabilizing forces imposed upon said plurality of screw shafts directly in axial tension and compression.

3. An expansible vehicle body comprising, a vehicle frame, a pair of expansible housings slidably mounted within said vehicle frame, said housings adapted to be shifted transversely with respect to said vehicle frame, a plurality of generally horizontal body expanding members mounted in said vehicle frame and extending transversely thereof, respective shiftable elements mounted on said body expanding members and adapted to be shifted transversely by said body expanding members, respective pairs of upper and lower connectors attached to said expansible housings and extending toward the shiftable elements of the body expanding members, means on said connectors slidably engaging the shiftable elements for advancing the connectors horizontally, said means providing vertical floating of the connectors relative to the shiftable elements, said connectors shifting said housings in opposite directions along a generally horizontal plane upon operation of the body expanding members, respective pairs of rollers mounted upon the vehicle frame on opposite sides thereof and in tracking engagement with the opposite ends of said housings, said rollers supporting the weight load of said housings along a line extending longitudinally thereof and providing a fulcrum support for the housings, and means for operating said body expanding members in unison whereby said shiftable elements are effective to shift said housings transversely, the housings in extended position being supported upon said rollers in cantilever fashion with respect to the vehicle frame and stabilized by said body expanding members with the stabilizing forces imposed upon the body expanding members along the longitudinal axes thereof.

4. An expansible vehicle body comprising, a vehicle frame, a pair of expansible housings slidably mounted within said vehicle frame, said housings adapted to be shifted transversely with respect to the opposite sides of said vehicle frame, respective pairs of upper and lower generally horizontal body expanding members mounted in said vehicle frame and extending transversely thereof, respective shiftable elements mounted on said body expanding members and adapted to be shifted transversely by said body expanding members, respective pairs of upper and lower connectors attached to said expansible housings and extending toward the said shiftable elements, means on said connectors slidably engaging the shiftable elements for advancing the connector horizontally, said means providing vertical floating of the connector relative to the shiftable elements, said connectors shifting said housings in unison and in opposite directions along a generally horizontal plane upon operation of said body expanding members, housing support means mounted upon the vehicle frame and in engagement with the housings, said housing support means bearing the weight load of said housings along a line extending longitudinally thereof and providing a fulcrum support for the housings, and means for operating the body expanding members in unison whereby said shiftable elements are effective to shift said housings transversely, the housings in extended position being supported upon said housing support means in cantilever fashion with respect to the vehicle frame and stabilized by said body expanding members with the stabilizing forces imposed upon the body expanding members along the longitudinal axes thereof.

5. An expansible vehicle body comprising, a vehicle frame, a pair of expansible housings slidably mounted within said vehicle frame, each of said housings comprising a rectangular structure having a side wall, a pair of end walls and a roof, said housings adapted to be shifted transversely with respect to opposite sides of said vehicle frame, a plurality of generally horizontal screw shafts rotatably journalled in said vehicle frame and extending transversely thereof, said screw shafts being disposed in respective upper and lower coaxial sets adjacent the upper and lower edges of said end walls, respective nuts in threaded engagement upon said screw shafts and adapted to be shifted axially thereof upon rotation of the screw shafts, respective connectors secured upon said end walls, each connector comprising a vertical channel, said channel having means slidably confining said nut therein, said means providing a vertically floating connection between the channel and nut and providing a driving connection therewith along the axes of said screw shafts, said connectors adapted to shift said housings in unison and in opposite directions along a generally horizontal plane upon rotation of said screw shafts, respective rollers mounted upon the vehicle frame and in tracking engagement with the lower edges of said end walls, said rollers supporting the weight load of the housings along a line which extends longitudinally thereof and providing a fulcrum support, and means for rotating said screw shafts in unison whereby the said nuts are effective to shift said housings and stabilize the same transversely with respect to the vehicle frame, with the stabilizing forces imposed upon said screw shafts in direct tension and compression.

6. An expansible vehicle body comprising, a vehicle frame, a pair of expansible housings slidably mounted within said frame, each of said housings comprising a rectangular unit having a side wall, a pair of end walls and a roof, a plurality of screw shafts extending transversely across said trailer frame and constituting coaxial upper and lower sets disposed in generally horizontal planes adjacent the upper and lower edges of said housings, means for rotating said screw shafts in unison, respective nuts mounted upon said screw shafts, respective connectors mounted upon the upper and lower edges of said housings and extending toward said screw shafts, means on said connectors slidably engaging the nuts for advancing the connectors along the axes of the screw shaft, said means providing vertical floating of the connectors relative to the nuts, rollers rotatably mounted upon the vehicle frame and in tracking engagement with the lower edges of the end walls of the housings, said rollers providing a fulcrum support bearing the weight load of said housings, whereby said housings in expanded position extend in cantilever fashion from the opposite sides of the vehicle frame with the stabilizing forces imposed directly in tension and compression through said screw shafts on opposite sides with said forces substantially neutralized with respect to the vehicle frame.

7. An expansible vehicle body comprising, a vehicle frame having a fixed floor and roof structure, a pair of expansible housings slidably mounted within said frame along opposite sides thereof, each of said housing sections comprising a rectangular unit having a side wall, a pair of end walls and a roof, respective transverse screw shafts disposed in generally horizontal planes adjacent the upper and lower edges of the end walls of said housings, respective upper and lower gear boxes journalling the inner ends of said screw shafts, said gear boxes being mounted upon the floor and roof structure of said vehicle frame, said screw shafts extending outwardly from the opposite sides of the gear boxes in coaxial pairs, driving means connected to said gear boxes, said gear boxes adapted to rotate said screw shafts in unison upon operation of said driving means, respective nuts mounted upon said screw shafts, respective connectors mounted upon the upper and lower edges of the end walls of said housings and in driving connection with said nuts, means on said connectors slidably engaging the nuts for advancing the connectors along the axes of the screw shafts, said means providing vertical floating of the connectors relative to the nuts, rollers rotatably mounted upon the vehicle frame and in tracking engagement with the lower edges of the end walls of the housings, said rollers providing a fulcrum support bearing the weight load of said housings, whereby said housings in expanded position extend in cantilever fashion from the opposite sides of the vehicle frame with the stabilizing forces acting directly in tension and compression through said coaxial screw shafts on opposite sides of the gear boxes, with said forces substantially neutralized with respect to the vehicle frame.

8. An expansible vehicle body comprising a vehicle frame having a fixed floor and roof structure, a pair of expansible housings slidably mounted within said frame along opposite sides thereof, each of said housing sections comprising a rectangular unit having a side wall, a pair of end walls and a roof, respective transverse screw shafts disposed in generally horizontal planes adjacent the upper and lower edges of the end walls of said housings, respective upper and lower gear boxes journalling the inner ends of said screw shafts, and in driving connection therewith, said screw shafts extending outwardly from the opposite sides of the gear boxes in coaxial pairs, said gear boxes being mounted upon the floor and roof structure of said vehicle frame, bearing means attached to the floor and roof structure rotatably journalling the outer ends of said screw shafts, said bearing means confining said screw shafts against axial thrust, a plurality of drive shafts in common driving connection with said gear boxes and adapted to rotate said screw shafts in unison, a respective nut threaded upon each of said screw shafts, a respective connector mounted upon the upper and lower edges of the end walls of said housings and in driving connection with said nuts, rollers rotatably mounted upon the vehicle frame and in tracking engagement with the lower edges of the end walls of the housings, said rollers providing a fulcrum support bearing the weight load of said housings, whereby said housings in expanded position extend in cantilever fashion from the opposite sides of the vehicle frame with the stabilizing forces acting directly in tension and compression through said screw shafts on opposite sides of the gear boxes with forces substantially neutralized with respect to the vehicle frame.

9. An expansible vehicle body comprising, a vehicle frame having a fixed floor structure, a pair of expansible housings slidably mounted along opposite sides of said frame, each of said housings including a side wall and a pair of end walls, said housings adapted to be shifted laterally with respect to the opposite sides of said frame, body expanding means connected to said housings, said body expanding means adapted to shift the housings to expanded and contracted positions, a pair of drop floor sections hingedly connected to the respective longitudinal side edges of said fixed floor, said floor sections adapted to be swung to a generally vertical plane and to reside adjacent the side walls of the housings when the same are contracted, a respective latch member mounted on the drop floor sections, a respective shiftable latching device pivotally mounted upon a surface adjacent an end of each drop floor section, each latching device having an upwardly projected portion engaging a respective latch member and latching said side drop floor sections generally in vertical positions with the floor sections inclined outwardly on opposite sides, the side walls of said housing sections contacting said drop floor sections as the housings approach their contracted position and swinging the same inwardly, said shiftable latching devices being overbalanced for downward pivotal movement, thereby to disengage said upwardly projected portion from said latch members in response to said inward motion to allow said drop floor sections to swing automatically toward horizontal position as the housing sections are expanded and floor support means projecting inwardly along the lower edges the housings adapted to engage the margins of said drop floor sections to support the same in horizontal position when the housings are expanded.

10. An expansible vehicle body comprising, a vehicle frame having a fixed floor structure, a pair of expansible housings slidably mounted along opposite sides of said frame, each of said housings including a side wall and a pair of end walls, said housings adapted to be shifted laterally with respect to the opposite sides of said frame, body expanding means connected to said housings, said body expanding means adapted to shift the housings to expanded and contracted positions, a pair of drop floor sections hingedly connected to the respective longitudinal side edges of said fixed floor, a second pair of drop floor sections hingedly connected to the opposite end edges of said fixed floor, said floor sections adapted to be swung to a generally vertical plane and to reside adjacent the side and end walls of the housings when the same are contracted, a respective shiftable latching device mounted on the end drop floor sections, respective cooperating latch members mounted on said side drop floor sections, each latching device having an upwardly projecting portion engaging a respective latch member and latching the floor sections collectively in vertical position with the side drop floor sections inclined outwardly on opposite sides, the side walls of said housing sections contacting said side drop floor sections as the housings approach their contracted position and swinging the same inwardly, said shiftable latching devices being biased for downward pivotal movement thereby to disengage said upwardly projected portion from said latch members in response to said inward motion to allow said side and end floor drop sections to swing automatically to horizontal position as the housing sections are expanded, and flanges projecting inwardly along the lower edges of the housings adapted to engage the margins of said floor sections to support the same in horizontal position when the housings are expanded.

11. An expansible vehicle body comprising, a vehicle frame having a fixed floor structure, a pair of expansible housings slidably mounted along opposite sides of said frame, each of said housings including a side wall and a pair of end walls, said housings adapted to be shifted laterally with respect to the opposite sides of said frame, respective body expanding means connected to said housings, said body expanding means adapted to shift the housings to expanded and contracted positions, a pair of drop floor sections hingedly connected to the respective longitudinal side edges of said fixed floor, a second pair of drop floor sections hingedly connected to the opposite end edges of said fixed floor, said floor sections adapted to be swung to a generally vertical plane and to reside adjacent the side and end walls of the housings when the same are contracted, respective hooks hingedly connected to the end drop floor sections adjacent the ends thereof, respective eyes mounted on said side drop floor sections, said hooks each having an upwardly projected portion adapted to extend through said eyes and to latch said side and end drop floor sections collectively in vertical position with the side drop floor sections inclined outwardly on opposite sides, the side walls of said housing sections adapted to contact said drop floor sections as the housings approach their contracted position and swing the same inwardly, said hooks being adapted to drop by gravity from said eyes in response to said inward motion, whereby said hooks are disengaged automatically from said eyes to allow said side and end drop floor sections to shift automatically to horizontal position when the housing sections are expanded, and flanges projecting inwardly along the lower edges of the housings adapted to engage the margins of said floor sections to support the same in horizontal position when the housings are expanded.

References Cited in the file of this patent

UNITED STATES PATENTS

| | | |
|---|---|---|
| 2,150,615 | Sword | Mar. 14, 1939 |
| 2,177,394 | Pierce | Oct. 24, 1939 |
| 2,494,680 | Wiley | Jan. 17, 1950 |
| 2,519,517 | Van Tassel | Aug. 22, 1950 |
| 2,636,773 | Van Tassel | Apr. 28, 1953 |

FOREIGN PATENTS

| | | |
|---|---|---|
| 131,809 | Australia | Mar. 17, 1949 |